(12) United States Patent
Honda et al.

(10) Patent No.: US 12,228,259 B2
(45) Date of Patent: Feb. 18, 2025

(54) VEHICLE LAMP

(71) Applicant: KOITO MANUFACTURING CO., LTD., Tokyo (JP)

(72) Inventors: Takahiko Honda, Shizuoka (JP); Tatsuki Ito, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 18/696,748

(22) PCT Filed: Oct. 21, 2022

(86) PCT No.: PCT/JP2022/039228
§ 371 (c)(1),
(2) Date: Mar. 28, 2024

(87) PCT Pub. No.: WO2023/074545
PCT Pub. Date: May 4, 2023

(65) Prior Publication Data
US 2024/0410543 A1    Dec. 12, 2024

(30) Foreign Application Priority Data
Oct. 28, 2021    (JP) ................................ 2021-176480

(51) Int. Cl.
| F21S 41/265 | (2018.01) |
| B60Q 1/04 | (2006.01) |
| F21S 41/40 | (2018.01) |

(52) U.S. Cl.
CPC .............. *F21S 41/265* (2018.01); *B60Q 1/04* (2013.01); *F21S 41/40* (2018.01)

(58) Field of Classification Search
CPC ............ F21S 41/265; F21S 41/40; B60Q 1/04
See application file for complete search history.

(56) References Cited

U.S. PATENT DOCUMENTS

| 2004/0125614 A1* | 7/2004 | Ishida ................... F21S 41/153 |
| | | 362/509 |
| 2013/0188380 A1* | 7/2013 | Sekiguchi ............... F21V 13/12 |
| | | 362/516 |

(Continued)

FOREIGN PATENT DOCUMENTS

| JP | 2017212169 A | 11/2017 |
| JP | 2019075232 A | 5/2019 |

(Continued)

OTHER PUBLICATIONS

International Search Report dated Dec. 13, 2022 filed in PCT/JP2022/039228.

*Primary Examiner* — Bryon T Gyllstrom
(74) *Attorney, Agent, or Firm* — McDonald Hopkins LLC

(57) ABSTRACT

In a vehicle lamp configured to emit light from a plurality of light emitting elements to a lamp front via a projection lens, a horizontally-long light distribution pattern can be formed as a clear light distribution pattern even in a case where a substrate is inclined in a left-right direction with respect to a vertical plane perpendicular to a lamp front-back direction. A projection lens is divided into a first lens region for controlling direct light from six first light emitting elements located closer to a front end portion of a substrate and a second lens region for controlling direct light from six second light emitting elements located closer to a back end portion of the substrate, and a focal length of the second lens region is set to a value greater than a focal length of the first lens region.

6 Claims, 14 Drawing Sheets

(56) References Cited

U.S. PATENT DOCUMENTS

| | | | | |
|---|---|---|---|---|
| 2017/0241605 A1* | 8/2017 | Yamamoto | ............ | F21S 41/338 |
| 2017/0343173 A1* | 11/2017 | Takada | .................. | F21S 41/321 |
| 2018/0363872 A1* | 12/2018 | Jo | ........................... | F21S 45/47 |
| 2019/0145596 A1* | 5/2019 | Suetsugu | .............. | F21S 41/663 |
| | | | | 362/521 |
| 2020/0088374 A1* | 3/2020 | Kogure | ................. | F21S 41/265 |
| 2022/0282844 A1* | 9/2022 | Nakada | ................... | F21S 41/50 |
| 2024/0377041 A1* | 11/2024 | Spinger | ................. | F21S 41/285 |

FOREIGN PATENT DOCUMENTS

| | | |
|---|---|---|
| JP | 2020087685 A | 6/2020 |
| JP | 2020205206 A | 12/2020 |

* cited by examiner

VEHICLE LAMP

TECHNICAL FIELD

The invention of the present application relates to a vehicle lamp including a projection lens.

BACKGROUND ART

Conventionally, as the configuration of a vehicle lamp, there has been known a configuration in which a horizontally-long light distribution pattern is formed by emitting light from a plurality of light emitting elements to a lamp front via a projection lens.

"Patent Literature 1" describes, as the configuration of such a vehicle lamp, a configuration in which a plurality of light emitting elements is mounted on a common substrate in a state in which the plurality of light emitting elements is arranged in a left-right direction and light emitting surfaces thereof face a projection lens.

CITATION LIST

Patent Literature

Patent Literature 1: JP-A-2019-75232

SUMMARY OF INVENTION

Problems to be Solved by Invention

In the vehicle lamp described in "Patent Literature 1" above, the substrate is arranged along a vertical plane perpendicular to a lamp front-back direction. However, there is a case where the substrate has to be arranged in a state of being inclined in the left-right direction with respect to the vertical plane due to a limitation on, e.g., a lamp arrangement space on a vehicle body side.

In such a case, since the plurality of light emitting elements cannot be arranged in an appropriate positional relationship with respect to the back focal point of the projection lens, it is difficult to form a horizontally-long light distribution pattern as a clear light distribution pattern.

The invention of the present application has been made in view of the above-described situation, and is intended to provide a vehicle lamp configured to form a horizontally-long light distribution pattern by emitting light from a plurality of light emitting elements to a lamp front via a projection lens. In the vehicle lamp, the horizontally-long light distribution pattern can be formed as a clear light distribution pattern even in a case where a substrate is arranged in a state of being inclined in a left-right direction with respect to a vertical plane perpendicular to a lamp front-back direction.

Solution to Problems

The invention of the present application aims to achieve the above-described object by devising the configuration of the projection lens.

That is, a vehicle lamp according to the invention of the present application is a vehicle lamp including a plurality of light emitting elements and a projection lens, the vehicle lamp being configured to form a horizontally-long light distribution pattern by emitting light from the plurality of light emitting elements to a lamp front via the projection lens. The plurality of light emitting elements is mounted on a common substrate in a state in which the light emitting elements are arranged in a left-right direction and light emitting surfaces thereof face the projection lens, the substrate is arranged in a state of being inclined in the left-right direction with respect to a vertical plane perpendicular to a lamp front-back direction, the plurality of light emitting elements includes a plurality of first light emitting elements located closer to a front end portion of the substrate and a plurality of second light emitting elements located closer to a back end portion of the substrate, the projection lens is divided into a first lens region for controlling direct light from the plurality of first light emitting elements and a second lens region for controlling direct light from the plurality of second light emitting elements, and the projection lens is configured such that the focal length of the second lens region is set to a value greater than the focal length of the first lens region.

The "plurality of light emitting elements" is mounted on the common substrate in a state in which the light emitting elements are arranged in the left-right direction and the light emitting surfaces thereof face the projection lens, but specific arrangement and number of the plurality of first and second light emitting elements are not particularly limited.

The "substrate" is arranged in a state of being inclined in the left-right direction with respect to the vertical plane perpendicular to the lamp front-back direction, but a specific value of the inclination angle is not particularly limited.

As long as the "projection lens" is configured such that the focal length of the second lens region is set to the value greater than the focal length of the first lens region, a specific focal length value of each of the first and second lens regions is not particularly limited.

Effects of Invention

The vehicle lamp according to the invention of the present application is configured such that the plurality of light emitting elements is mounted on the common substrate in a state in which the plurality of light emitting elements is arranged in the left-right direction and the light emitting surfaces thereof face the projection lens, and therefore, the horizontally-long light distribution pattern can be formed by emitting the light from the plurality of light emitting elements to the lamp front via the projection lens and can be formed by an inexpensive lamp configuration.

In this state, since the substrate is arranged in a state of being inclined in the left-right direction with respect to the vertical plane perpendicular to the lamp front-back direction, it is possible to easily ensure a lamp arrangement space according to a limitation on, e.g., a vehicle body shape.

In addition, the projection lens is divided into the first lens region for controlling the direct light from the plurality of first light emitting elements located closer to the front end portion of the substrate and the second lens region for controlling the direct light from the plurality of second light emitting elements located closer to the back end portion of the substrate, and the focal length of the second lens region is set to a value greater than the focal length of the first lens region. Thus, the following features and advantageous effects can be obtained.

That is, since the substrate is arranged in a state of being inclined in the left-right direction with respect to the vertical plane perpendicular to the lamp front-back direction, a distance between the projection lens and the plurality of second light emitting elements is a value greater than a distance between the projection lens and the plurality of first light emitting elements. However, since the projection lens is set such that the focal length of the second lens region is set to a value greater than the focal length of the first lens region, the plurality of first light emitting elements and the plurality of second light emitting elements can be arranged in an appropriate positional relationship with respect to the back focal point of the projection lens. Thus, the horizontally-long light distribution pattern can be formed as a clear light distribution pattern.

As described above, according to the invention of the present application, in the vehicle lamp configured to form the horizontally-long light distribution pattern by emitting the light from the plurality of light emitting elements to the lamp front via the projection lens, the horizontally-long light distribution pattern can be formed as a clear light distribution pattern even in a case where the substrate is arranged in a state of being inclined in the left-right direction with respect to the vertical plane perpendicular to the lamp front-back direction. Moreover, this pattern can be formed by an inexpensive lamp configuration.

Further, in the above-described configuration, the projection lens is configured such that the front surface thereof is a single convex surface and the back surface thereof is a convex surface in which the first lens region and the second lens region have curvatures different from each other or a flat surface. Thus, it is possible to accurately control the direct light from each of the plurality of first light emitting elements and the plurality of second light emitting elements in each of the first and second lens regions while preventing degradation of the design of the projection lens.

In this case, as the configuration of the back surface of the projection lens, the surface shape of each of the first and second lens regions is set such that a first projection image formed by the direct light from each of the plurality of first light emitting elements and a second projection image formed by the direct light from each of the plurality of second light emitting elements alternately and partially overlap with each other in the horizontally-long light distribution pattern. With this configuration, the horizontally-long light distribution pattern can be easily formed as a light distribution pattern with uniform brightness.

In the above-described configuration, the plurality of light emitting elements can be individually turned on, and therefore, the horizontally-long light distribution pattern can be formed as a partially-missing light distribution pattern, and a traveling path in front can be irradiated as widely as possible within a range in which glare is not given to, e.g., a driver of an oncoming vehicle.

In the above-described configuration, a light shielding member for preventing the incidence of the direct light from the plurality of first light emitting elements on the second lens region and the incidence of the direct light from the plurality of second light emitting elements on the first lens region is further provided, so that the first projection image formed by the direct light from each of the plurality of first light emitting elements and the second projection image formed by the direct light from each of the plurality of second light emitting elements can be clearly formed in the horizontally-long light distribution pattern.

In this configuration, the light shielding member is configured as a light shielding plate arranged between the substrate and the projection lens along a vertical plane extending in the lamp front-back direction, and the left and right surfaces thereof are formed as reflection surfaces. Thus, the light emitted from the plurality of first light emitting elements and the light emitted from the plurality of second light emitting elements can be effectively used as light for forming the horizontally-long light distribution pattern.

BRIEF DESCRIPTION OF DRAWINGS

FIG. 1*l* is a view similar to FIG. 3, which shows a third modification of the embodiment;

DESCRIPTION OF EMBODIMENTS

Embodiments of the invention of the present application will be described hereinafter with reference to the drawings.

Figure 1:
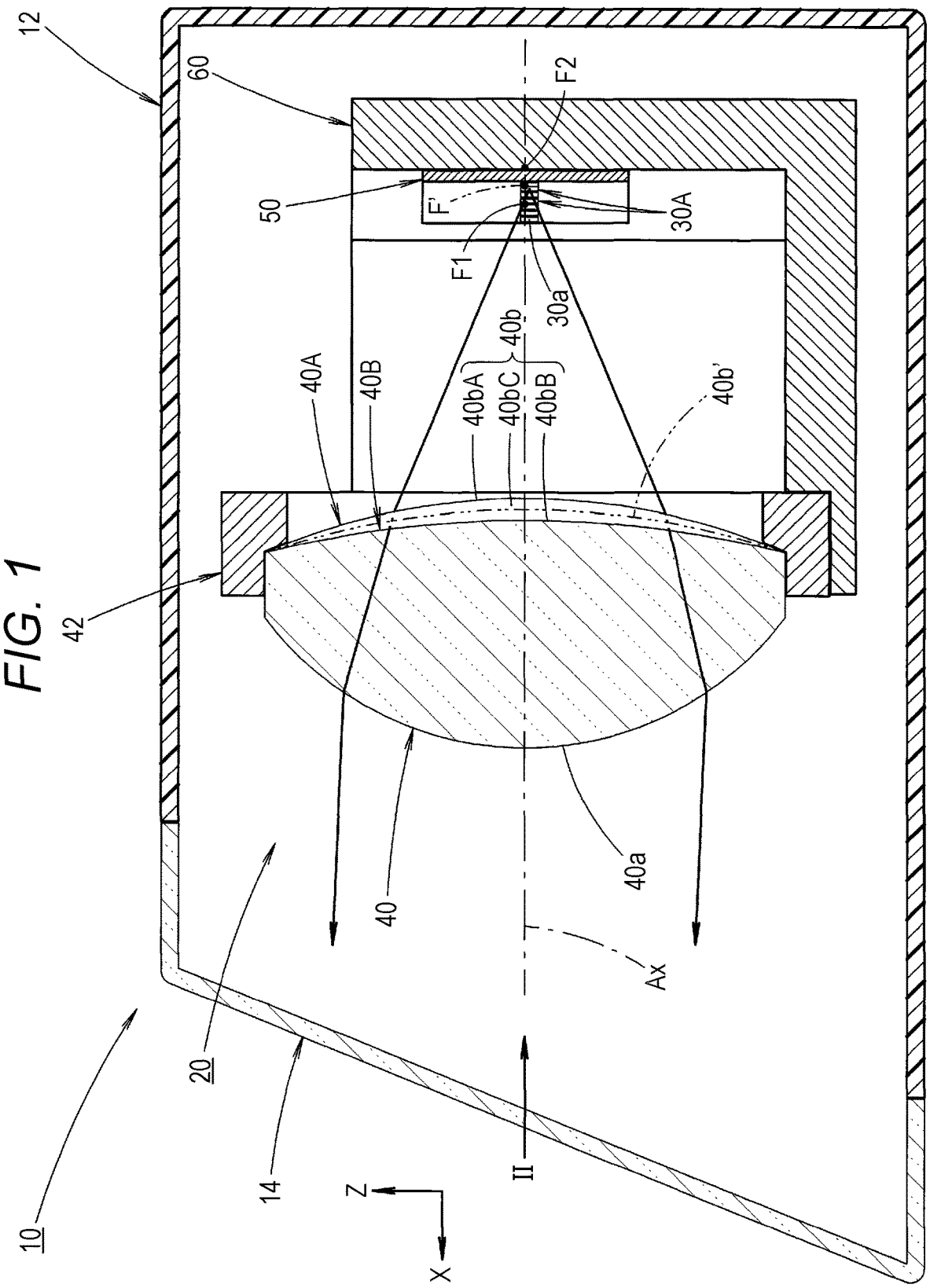
FIG. 1 is a side sectional view showing a vehicle lamp according to one embodiment of the invention of the present application.
Figure 2:
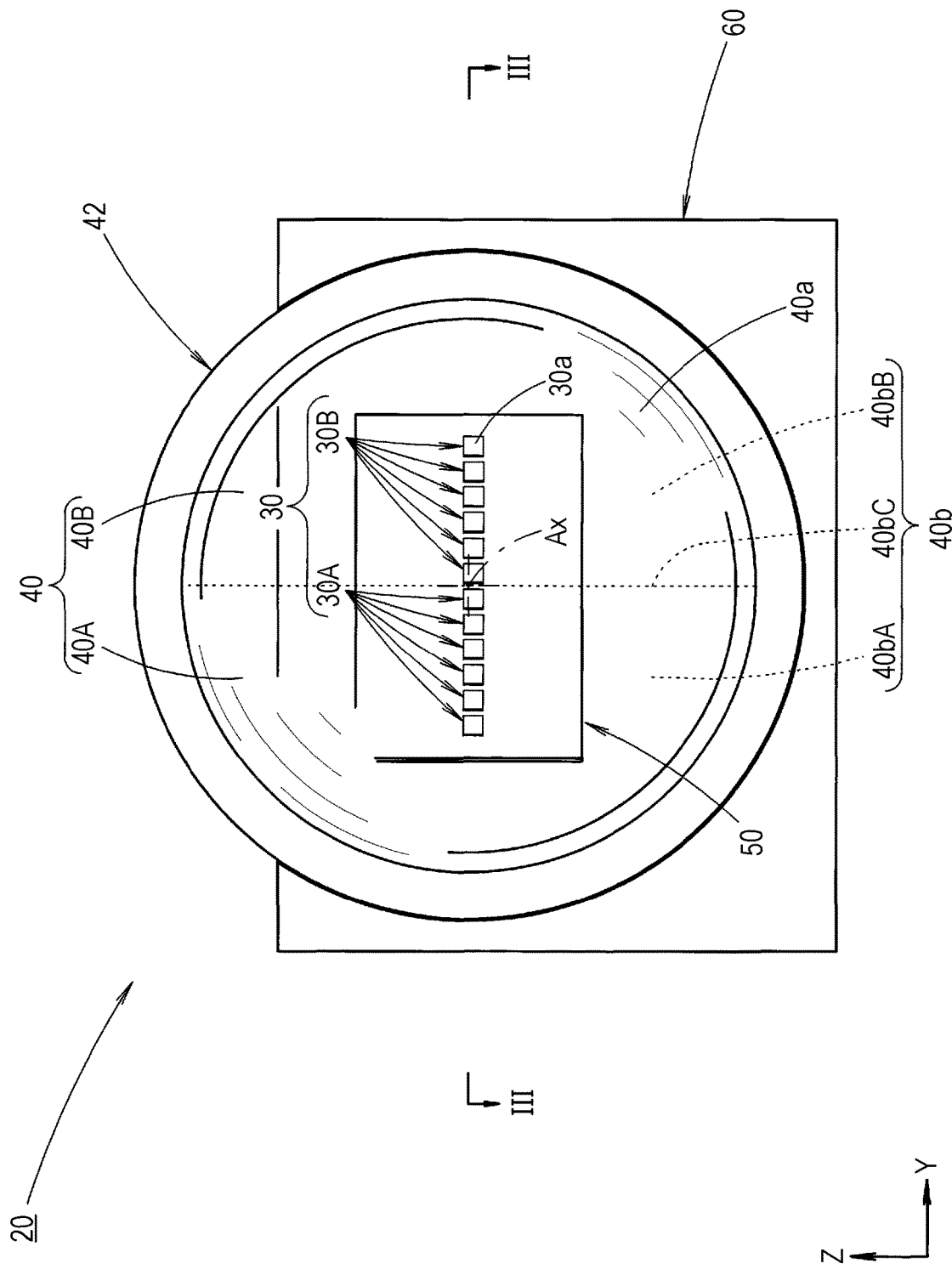
FIG. 2 is a view from a direction II in FIG. 1.
Figure 3:
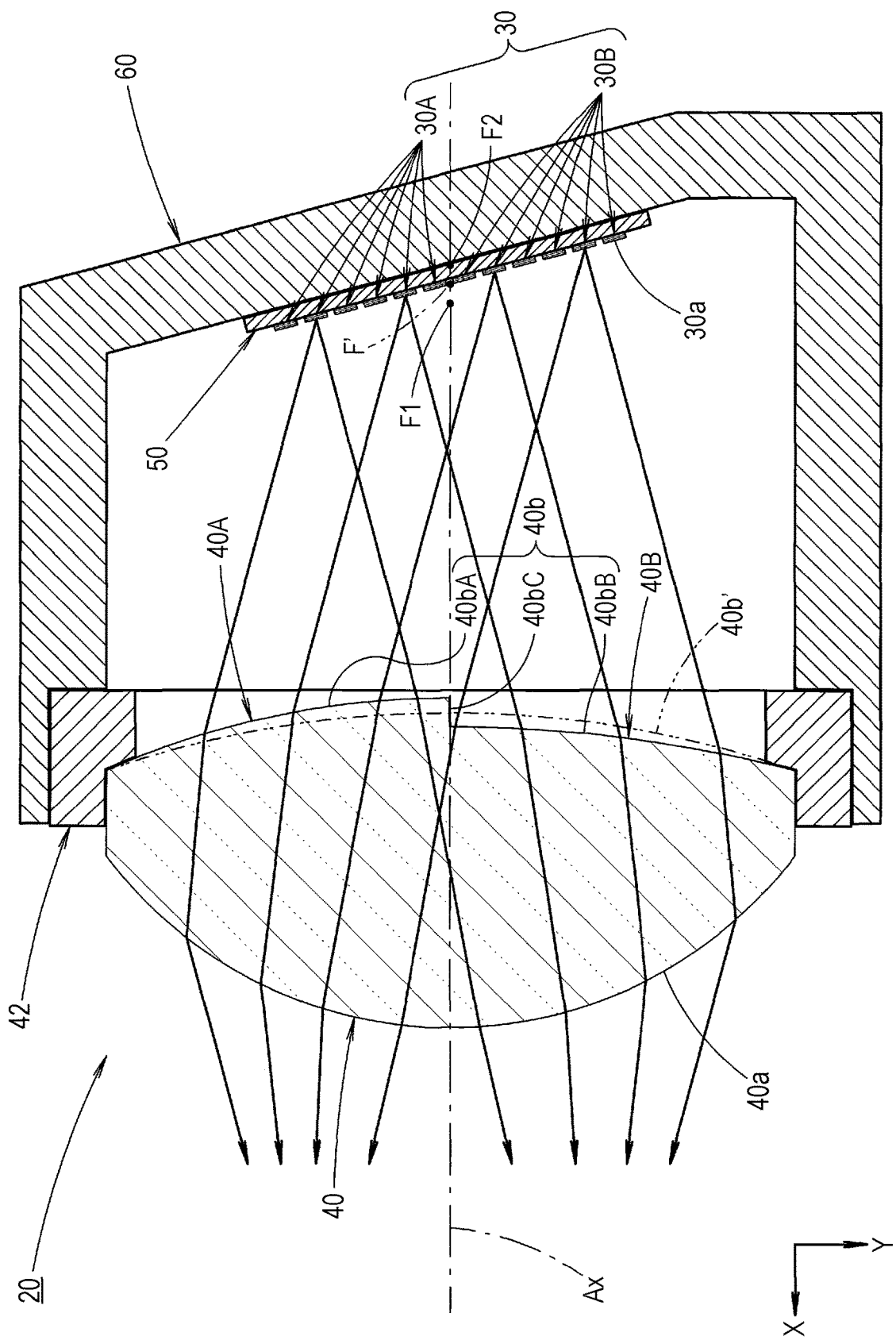
FIG. 3 is a sectional view taken along line III-III in FIG. 2.

FIG. 1 is a side sectional view showing a vehicle lamp 10 according to one embodiment of the invention of the present application. FIG. 2 is a view from a direction II in FIG. 1, and FIG. 3 is a sectional view taken along line III-III in FIG. 2. In these figures, a direction represented by X is a "lamp front," a direction represented by Y is a "left direction" ("right direction" in a lamp front view) perpendicular to the "lamp front," and a direction represented by Z is an "up direction." The same applies to figures other than these figures.

As shown in FIG. 1, the vehicle lamp 10 is a headlamp provided at a front end portion of a vehicle, and is configured such that a lamp unit 20 is housed in a lamp chamber formed by a lamp body 12 and a translucent cover 14.

The lamp unit 20 is a so-called projector type lamp unit, and includes 12 light emitting elements 30 and a projection lens 40. By emitting light from the 12 light emitting elements 30 to the lamp front via the projection lens 40, an additional high-beam light distribution pattern (described later) is formed.

The projection lens 40 is a biconvex lens, and has an optical axis Ax extending in the lamp front-back direction. The projection lens 40 projects a light source image, which is formed on a back focal plane as a focal plane including back focal points F1, F2 (described later), as an inverted image on a virtual vertical screen in the lamp front (that is, vehicle front).

The projection lens 40 has a circular outer shape centered on the optical axis Ax, and at an outer peripheral edge thereof, is supported by a lens holder 42. The lens holder 42 is supported by a heat sink 60.

The 12 light emitting elements 30 are arranged in the left-right direction on a horizontal plane including the optical axis Ax of the projection lens 40, and in this state, are mounted on a common substrate 50. The substrate 50 is supported by the heat sink 60.

As shown in FIG. 3, the substrate 50 is arranged so as to extend in a direction inclined in the left-right direction with respect to a vertical plane perpendicular to the lamp front-back direction.

Specifically, the substrate 50 is arranged in a state of being inclined to the lamp back side from the right side (left side in the lamp front view) to the left side with respect to the vertical plane. In this state, the inclination angle of the substrate 50 with respect to the vertical plane is set to a value of 10 to 20° (for example, about 15°). With this configuration, the 12 light emitting elements 30 are arranged in a state in which light emitting surfaces 30a thereof are inclined leftward by 10 to 20° (for example, about) 15° with respect to the lamp front direction (that is, a state in which the light emitting surfaces 30a face the projection lens 40).

Each of the 12 light emitting elements 30 includes a white light emitting diode having the rectangular (specifically, square) light emitting surface 30a, and these light emitting elements 30 are arranged at slight intervals. In this state, each light emitting element 30 is arranged in a state in which the light emitting center (that is, the center position of the light emitting surface 30a) thereof is displaced slightly downward from the horizontal plane including the optical axis Ax.

Hereinafter, six light emitting elements 30 located on the right side with respect to the optical axis Ax (that is, closer to a front end portion of the substrate 50) will be described as first light emitting elements 30A, and six light emitting elements 30 located on the left side with respect to the optical axis Ax (that is, close to a back end portion of the substrate 50) will be described as second light emitting elements 30B.

A front surface 40a of the projection lens 40 is a single convex surface centered on the optical axis Ax. On the other hand, the back surface 40b of the projection lens 40 is a convex surface in which a first back surface region 40bA located on the right side with respect to the optical axis Ax and a second back surface region 40bB located on the left side with respect to the optical axis Ax have curvatures different from each other. The first and second back surface regions 40bA, 40bB are connected to each other via a connection region 40bC extending along the vertical plane including the optical axis Ax.

A curve indicated by a two-dot chain line in FIGS. 1 and 3 indicates the surface shape of a back surface 40b' of the projection lens 40 in a case where a back focal point F' of the projection lens 40 is at the center position between the light emitting surfaces 30a of the first and second light emitting elements 30A, 30B adjacent to each other with the optical axis Ax interposed therebetween.

The projection lens 40 is configured such that the focal length of a second lens region 40B located on the left side with respect to the optical axis Ax is set to a value greater than the focal length of a first lens region 40A located on the right side with respect to the optical axis Ax.

Specifically, a back focal point F1 of the first lens region 40A is located on the lamp front side with respect to the back focal point F', and a back focal point F2 of the second lens region 40B is located on the lamp back side with respect to the back focal point F'. In this state, the back focal point F1 of the first lens region 40A is preferably set in the vicinity of the center of the light emitting surfaces 30a of the six first light emitting elements 30A in the lamp front-back direction, and is preferably set at the same position as the center position. Moreover, the back focal point F2 of the second lens region 40B is preferably set in the vicinity of the center of the light emitting surfaces 30a of the six second light emitting elements 30B in the lamp front-back direction, and is preferably set at the same position as the center position.

The projection lens 40 is configured such that the first lens region 40A is set as a lens region for controlling direct light from the six first light emitting elements 30A and the second lens region 40B is set as a lens region for controlling direct light from the six second light emitting elements 30B. That is, the first lens region 40A inversely projects light source images of the six first light emitting elements 30A formed on the focal plane including the back focal point F1, and the second lens region 40B inversely projects light source images of the six second light emitting elements 30B formed on the focal plane including the back focal point F2.

Figure 4:
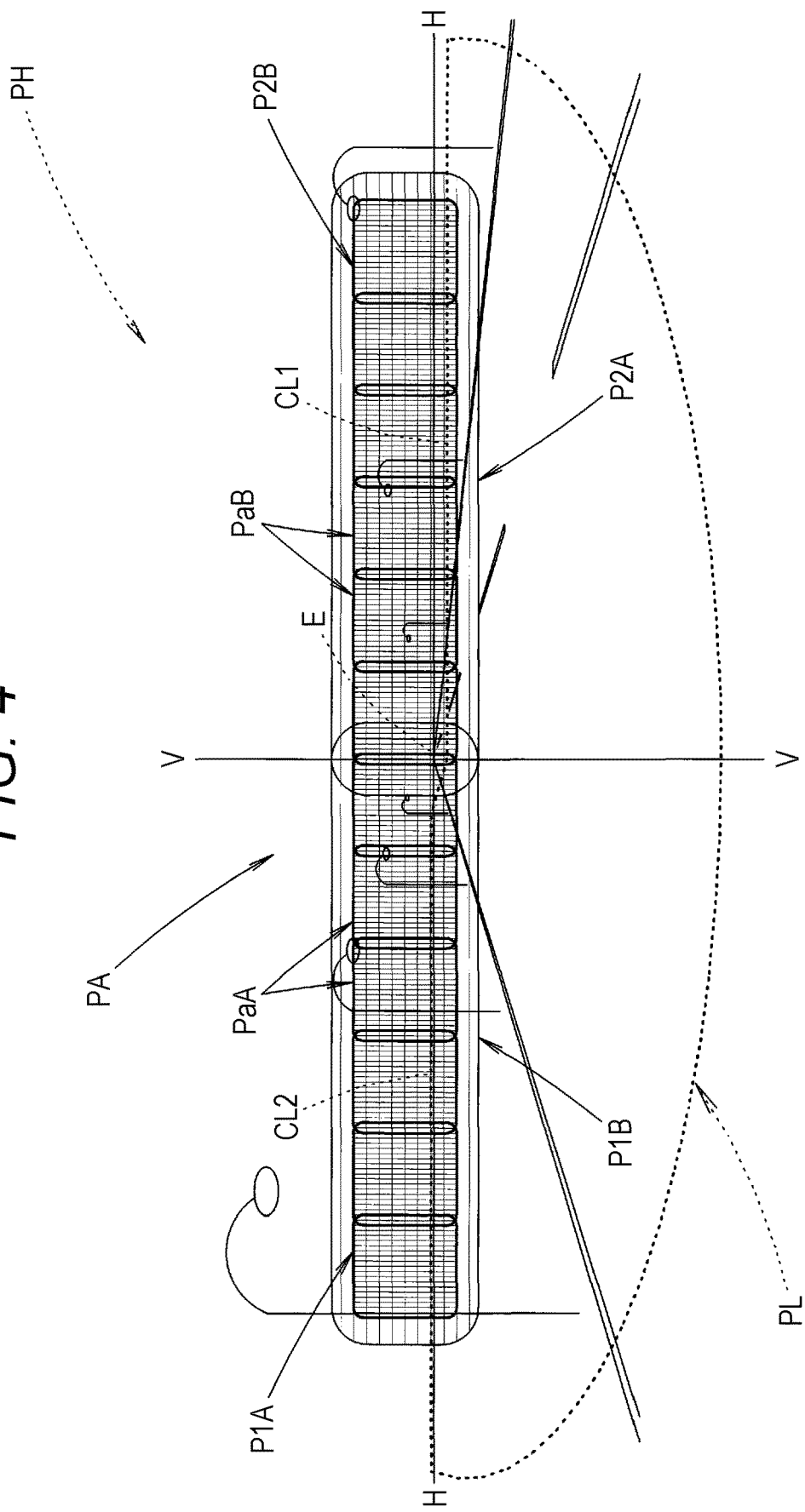
FIG. 4 is a view showing an additional light distribution pattern formed with light emitted from the vehicle lamp.

FIG. 4 is a transparent view showing an additional light distribution pattern PA formed on a virtual vertical screen arranged at a position of 25 m in front of the vehicle by light emitted from the lamp unit 20 of the vehicle lamp 10 to the lamp front.

As shown in FIG. 4, the additional light distribution pattern PA is a light distribution pattern formed in addition to a low-beam light distribution pattern PL when a high-beam light distribution pattern PH is formed.

As indicated by a broken line in the figure, the low-beam light distribution pattern PL is a low-beam light distribution pattern of left light distribution, and includes, at the upper edge thereof, cut-off lines CL1, CL2 on the left and right sides at different heights. The cut-off lines CL1, CL2 extend in the horizontal direction at different heights on the left and right sides across a line V-V passing in the vertical direction through H-V, which is a vanishing point in the lamp front direction. An opposite lane portion on the right side with respect to the line V-V is formed as the lower cut-off line CL1, and a subject driving lane portion on the left side with respect to the line V-V is formed as the upper cut-off line CL2 stepped up from the lower cut-off line CL1 via an inclined portion.

In the low-beam light distribution pattern PL, an elbow point E, which is an intersection point between the lower cut-off line CL1 and the line V-V, is positioned approximately 0.5 to 0.6° below H-V.

The additional light distribution pattern PA is formed as a horizontally-long light distribution pattern elongated in the left-right direction on an H-H line passing in the horizontal direction through H-V by the light emitted from the six first light emitting elements 30A and the six second light emitting elements 30B.

The additional light distribution pattern PA overlaps, in a lower end region thereof, with a region of the low-beam light distribution pattern PL in the vicinity of the cutoff line, whereby the high-beam light distribution pattern PH is formed as a light distribution pattern having no gap between the low-beam light distribution pattern PL and the additional light distribution pattern PA.

Figure 5:
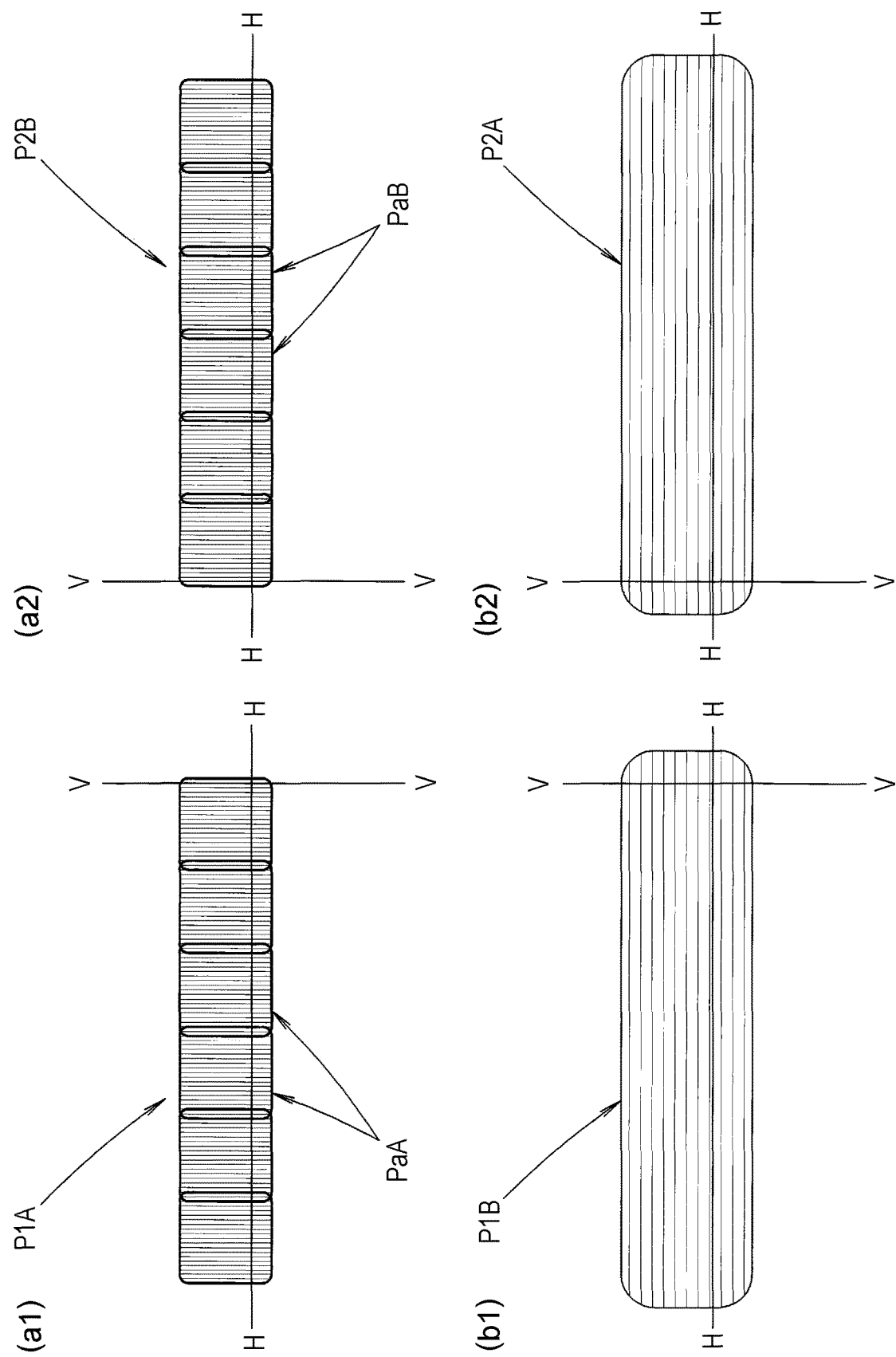
FIG. 5 is a view showing the additional light distribution pattern in a state of the additional light distribution pattern being divided into a plurality of light distribution patterns.

The additional light distribution pattern PA is formed as a combined light distribution pattern of four light distribution patterns P1A, P2B, P1B, P2A shown in FIG. 5. In this state, the pair of left and right light distribution patterns P1A, P2B is light distribution patterns mainly forming the additional light distribution pattern PA while the pair of left and right light distribution patterns P1B, P2A is additional light distribution patterns formed in association with these light distribution patterns P1A, P2B.

As shown in FIG. 5(a1), the light distribution pattern PIA is a light distribution pattern formed by direct light emitted from the six first light emitting elements 30A and penetrated the first lens region 40A of the projection lens 40, and as a combined light distribution pattern of six small light distribution patterns PaA, is formed elongated in the left direction from the vicinity of the V-V line.

Each of the six small light distribution patterns PaA is a bright and clear rectangular light distribution pattern formed as an inverted projection image (that is, first projection image) of each of the six first light emitting elements 30A located in the vicinity of the focal plane including the back focal point F1 of the first lens region 40A, and is formed in a state in which the small light distribution patterns PaA adjacent to each other slightly overlap with each other.

As shown in FIG. 5(a2), the light distribution pattern P2B is a light distribution pattern formed by direct light emitted from the six second light emitting elements 30B and penetrated the second lens region 40B of the projection lens 40, and as a combined light distribution pattern of six small light distribution patterns PaB, is formed elongated in the right direction from the vicinity of the V-V line.

Each of the six small light distribution patterns PaB is a bright and clear rectangular light distribution pattern formed as an inverted projection image (that is, second projection image) of each of the six second light emitting elements 30B located in the vicinity of the focal plane including the back focal point F2 of the second lens region 40B, and is formed in a state in which the small light distribution patterns PaB adjacent to each other slightly overlap with each other.

As shown in FIG. 5(b1), the light distribution pattern P1B is a light distribution pattern formed by direct light emitted from the six first light emitting elements 30A and penetrated the second lens region 40B of the projection lens 40.

The light distribution pattern P1B is formed as a group of inverted projection images of the six first light emitting elements 30A via the second lens region 40B. Since the six first light emitting elements 30A are greatly displaced from the focal plane including the back focal point F2 of the second lens region 40B to the lamp front side, the light distribution pattern P1B is formed, as a blurred light distribution pattern having brightness lower than that of the light distribution pattern PIA, so as to extend from the vicinity of the V-V line in the left direction with a vertical width greater than that of the light distribution pattern PIA.

As shown in FIG. 5(b2), the light distribution pattern P2A is a light distribution pattern formed by direct light emitted from the six second light emitting elements 30B and penetrated the first lens region 40A of the projection lens 40.

The light distribution pattern P2A is formed as a group of inverted projection images of the six second light emitting elements 30B via the first lens region 40A. Since the six second light emitting elements 30B are greatly displaced from the focal plane including the back focal point F1 of the first lens region 40A to the lamp back side, the light distribution pattern P2A is formed, as a blurred light distribution pattern having brightness lower than that of the light distribution pattern P2B, so as to extend from the vicinity of the V-V line in the right direction with a vertical width greater than that of the light distribution pattern P2B.

As shown in FIG. 4, the additional light distribution pattern PA is formed as a horizontally-long, bright, and clear light distribution pattern by the pair of left and right light distribution patterns P1A, P2B, and by superimposing the pair of left and right light distribution patterns P1B, P2A thereon, is formed as a light distribution pattern with less light distribution unevenness such that the vertical width thereof is expanded and the overall brightness thereof is enhanced. As a result, the high-beam light distribution pattern PH provides excellent visibility of a traveling path in the vehicle front.

Next, the features and advantageous effects of the present embodiment will be described.

The lamp unit 20 of the vehicle lamp 10 according to the present embodiment is configured such that the 12 light emitting elements 30 are mounted on the common substrate 50 in a state in which the 12 light emitting elements 30 are arranged in the left-right direction and the light emitting surfaces 30a thereof face the projection lens 40, and therefore, the horizontally-long additional light distribution pattern PA can be formed by emitting the light from the 12 light emitting elements 30 to the lamp front via the projection lens 40 and can be formed by an inexpensive lamp configuration.

In this state, since the substrate 50 is arranged in a state of being inclined in the left-right direction with respect to the vertical plane perpendicular to the lamp front-back direction, it is possible to easily ensure a lamp arrangement space according to a limitation on, e.g., a vehicle body shape.

In addition, the projection lens 40 is divided into the first lens region 40A for controlling the direct light from the six first light emitting elements 30A located closer to the front end portion of the substrate 50 and the second lens region 40B for controlling the direct light from the six second light emitting elements 30B located closer to the back end portion of the substrate 50, and the focal length of the second lens region 40B is set to the value greater than the focal length of the first lens region 40A. Thus, the following features and advantageous effects can be obtained.

That is, since the substrate 50 is arranged in a state of being inclined in the left-right direction with respect to the vertical plane perpendicular to the lamp front-back direction, a distance between the projection lens 40 and the six second light emitting elements 30B is a value greater than a distance between the projection lens 40 and the six first light emitting elements 30A. However, since the projection lens 40 is set such that the focal length of the second lens region 40B is set to the value greater than the focal length of the first lens region 40A, the six first light emitting elements 30A and the six second light emitting elements 30B can be arranged in an appropriate positional relationship with respect to the back focal point F1 of the first lens region 40A and the back focal point F2 of the second lens region 40B. Thus, the additional light distribution pattern PA can be formed as a clear light distribution pattern.

As described above, according to the present embodiment, in the vehicle lamp 10 configured to form the horizontally-long additional light distribution pattern PA by emitting the light from the 12 light emitting elements 30 to the lamp front via the projection lens 40, the additional light distribution pattern PA can be formed as a clear light distribution pattern even though the substrate 50 is arranged in a state of being inclined in the left-right direction with respect to the vertical plane perpendicular to the lamp front-back direction. Moreover, this pattern can be formed by an inexpensive lamp configuration.

Further, in the present embodiment, the projection lens 40 is configured such that the front surface 40a thereof is the single convex surface and the back surface 40b thereof is the convex surface in which the first lens region 40A and the second lens region 40B have curvatures different from each other. Thus, it is possible to accurately control the direct light from each of the six first light emitting elements 30A and the six second light emitting elements 30B in each of the first and second lens regions 40A, 40B while preventing degradation of the design of the projection lens 40.

In addition, in the present embodiment, since the pair of left and right light distribution patterns P1B, P2A is superimposed on the pair of left and right light distribution patterns P1A, P2B formed as clear light distribution patterns, the additional light distribution pattern PA can be formed as a light distribution pattern with less light distribution unevenness such that the vertical width thereof is expanded and the overall brightness thereof is enhanced.

In the above-described embodiment, it has been described that the back surface 40b is such a convex surface that the first lens region 40A and the second lens region 40B have the curvatures different from each other, but either one of the first lens region 40A and the second lens region 40B may be a flat surface (or a concave surface).

In the above-described embodiment, it has been assumed that the projection lens 40 has a circular outer shape, but the projection lens 40 may have an outer shape other than the circular outer shape.

In the above-described embodiment, it has been described that the lamp unit 20 includes the six first light emitting elements 30A and the six second light emitting elements 30B, but the lamp unit 20 may include other numbers of first and second light emitting elements 30A, 30B.

In the above-described embodiment, it has been described that the light emitting surface 30a of each of the first and second light emitting elements 30A, 30B has a square outer shape, but the light emitting surface 30a may have an outer shape other than the square outer shape (for example, vertically-long rectangular outer shape or horizontally-long rectangular outer shape).

Next, modifications of the above-described embodiment will be described.

First, a first modification of the above-described embodiment will be described.

Figure 6:
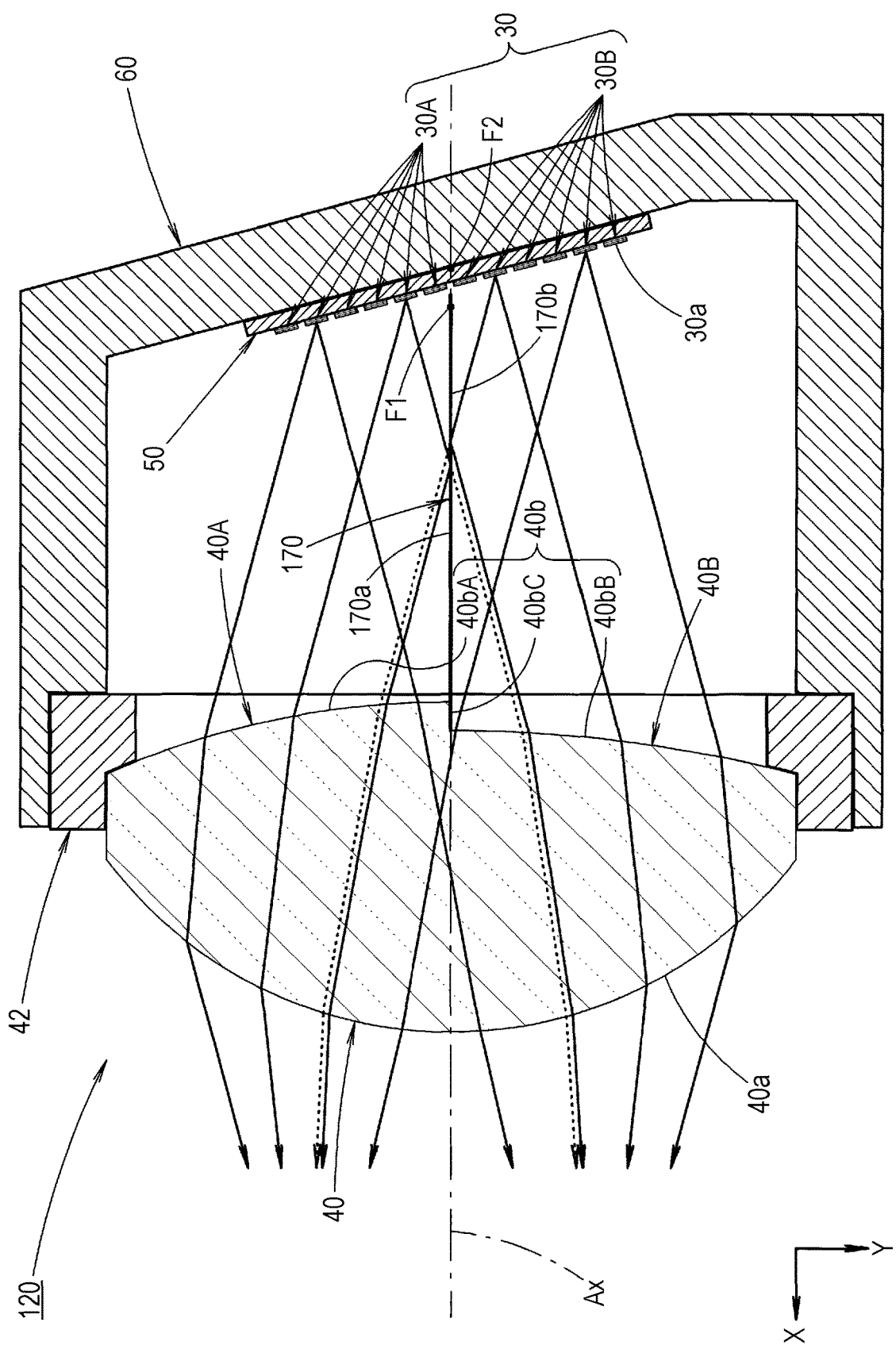
FIG. 6 is a view similar to FIG. 3, which shows a first modification of the embodiment.

FIG. 6 is a view similar to FIG. 3, which shows a lamp unit 120 of a vehicle lamp according to the present modification.

As shown in FIG. 6, a basic configuration of the lamp unit 120 is similar to that of the lamp unit 20 of the above-described embodiment, but the lamp unit 120 is different from the case of the above-described embodiment in that a light shielding plate 170 is additionally arranged.

The light shielding plate 170 is a light shielding member for blocking the direct light from the six first light emitting elements 30A from entering the second lens region 40B and blocking the direct light from the six second light emitting elements 30B from entering the first lens region 40A, and is arranged between the substrate 50 and the projection lens 40 so as to extend in the lamp front-back direction along the vertical plane including the optical axis Ax. In this state, the light shielding plate 170 is formed such that the front edge thereof extends to a connection region 40bC of the back surface 40b of the projection lens 40 and the back edge thereof extends to the vicinity of the substrate 50, and the vertical width thereof is set to a value slightly smaller than the outer diameter of the projection lens 40. Note that the light shielding plate 170 is supported by the lens holder 42 or the heat sink 60.

Both left and right surfaces of the light shielding plate 170 are formed as reflection surfaces. That is, the right surface 170a and left surface 170b of the light shielding plate 170 are subjected to reflection surface treatment by, e.g., aluminum vapor deposition. The light shielding plate 170 is configured such that the direct light from the six first light emitting elements 30A is specularly reflected by the right surface 170a and enters the first lens region 40A and the direct light from the six second light emitting elements 30B is specularly reflected by the left surface 170b and enters the second lens region 40B.

Note that an optical path indicated by a broken line in FIG. 6 is an optical path in a case where no light shielding plate 170 is arranged.

Figure 7:
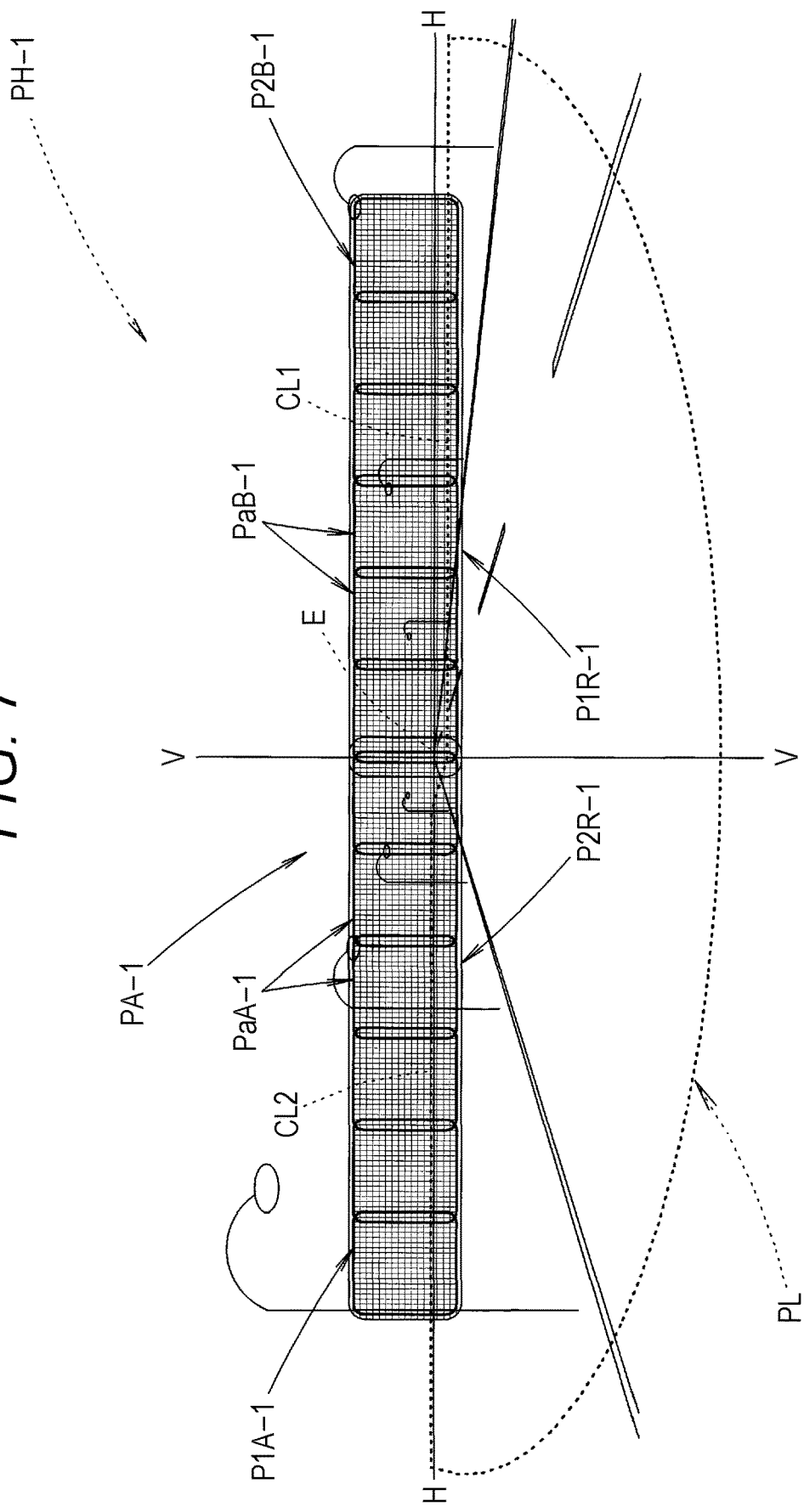
FIG. 7 is a view similar to FIG. 4, which shows the features of the first modification.

FIG. 7 is a transparent view showing an additional light distribution pattern PA-1 formed on the virtual vertical screen by light emitted from the lamp unit 120 to the lamp front.

As shown in FIG. 7, the additional light distribution pattern PA-1 is formed as a horizontally-long light distribution pattern elongated in the left-right direction on the H-H line as in the additional light distribution pattern PA of the above-described embodiment.

The additional light distribution pattern PA-1 overlaps, in a lower end region thereof, with a region of the low-beam light distribution pattern PL in the vicinity of the cutoff line, whereby a high-beam light distribution pattern PH-1 is formed as a light distribution pattern having no gap between the low-beam light distribution pattern PL and the additional light distribution pattern PA-1.

Figure 8:
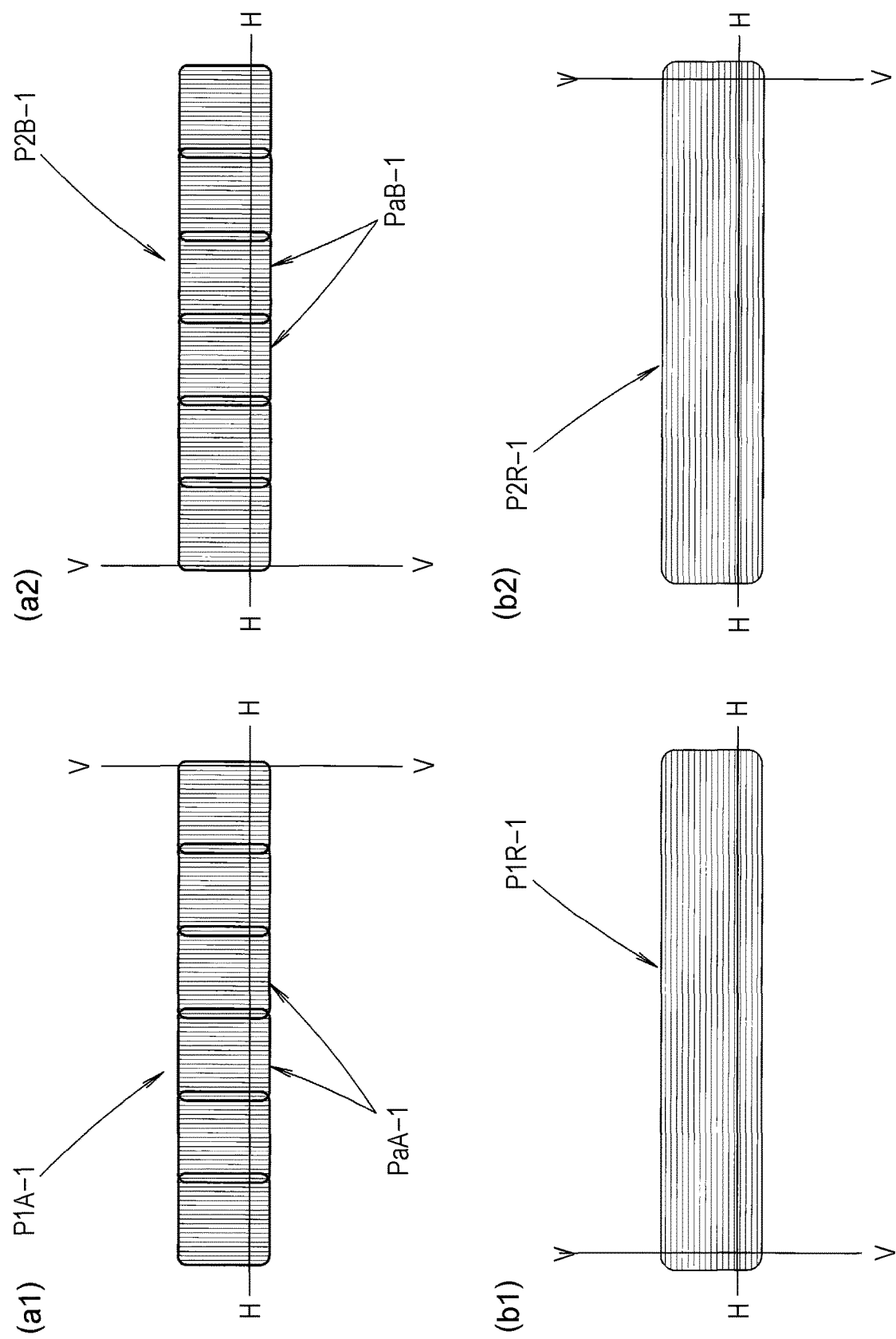
FIG. 8 is a view similar to FIG. 5, which shows the features of the first modification.

The additional light distribution pattern PA-1 is formed as a combined light distribution pattern of four light distribution patterns P1A-1, P2B-1, P1R-1, P2R-1 shown in FIG. 8.

As shown in FIG. 8(a1), the light distribution pattern P1A-1 is a light distribution pattern formed by the direct light emitted from the six first light emitting elements 30A and penetrated the first lens region 40A of the projection lens 40, and as a combined light distribution pattern of six small light distribution patterns PaA-1, is formed elongated in the left direction from the vicinity of the V-V line as in the light distribution pattern P1A shown in FIG. 5(a1).

As shown in FIG. 8(a2), the light distribution pattern P2B-1 is a light distribution pattern formed by the direct light emitted from the six second light emitting elements 30B and penetrated the second lens region 40B of the projection lens 40, and as a combined light distribution pattern of six small light distribution patterns PaB-1, is formed elongated in the right direction from the vicinity of the V-V line as in the light distribution pattern P2B shown in FIG. 5(a2).

As shown in FIG. 8(b1), the light distribution pattern P1R-1 is a light distribution pattern formed by the light emitted from the six first light emitting elements 30A, specularly reflected by the right surface 170a of the light shielding plate 170, and then penetrated the first lens region 40A of the projection lens 40. The light distribution pattern P1R-1 is formed as a horizontally-long bright light distribution pattern extending in the right direction from the vicinity of the V-V line with substantially the same vertical width as that of the light distribution pattern P1A-1.

As shown in FIG. 8(b2), the light distribution pattern P2R-1 is a light distribution pattern formed by the direct light emitted from the six second light emitting elements 30B, specularly reflected by the left surface 170b of the light shielding plate 170, and then penetrated the second lens region 40B of the projection lens 40. The light distribution pattern P2R-1 is formed as a horizontally-long bright light distribution pattern extending in the left direction from the vicinity of the V-V line with substantially the same vertical width as that of the light distribution pattern P2B-1.

As shown in FIG. 7, the additional light distribution pattern PA-1 is formed as a horizontally-long, bright, and clear light distribution pattern by the pair of left and right light distribution patterns P1A-1, P2B-1, and by superimposing the pair of left and right bright light distribution patterns P2R-1, P1R-1 thereon, is formed as a light distribution pattern entirely with sufficiently-enhanced brightness. As a result, the high-beam light distribution pattern PH-1 provides excellent visibility of the traveling path in the vehicle front.

Even in a case where the configuration of the present modification is employed, it is possible to obtain features and advantageous effects substantially similar to those in the case of the above-described embodiment.

In particular, in the present modification, since the additional light distribution pattern PA-1 can be formed as a sufficiently-bright light distribution pattern, the high-beam light distribution pattern PH-1 can be a light distribution pattern excellent in distance visibility.

Next, a second modification of the above-described embodiment will be described.

Figure 9:
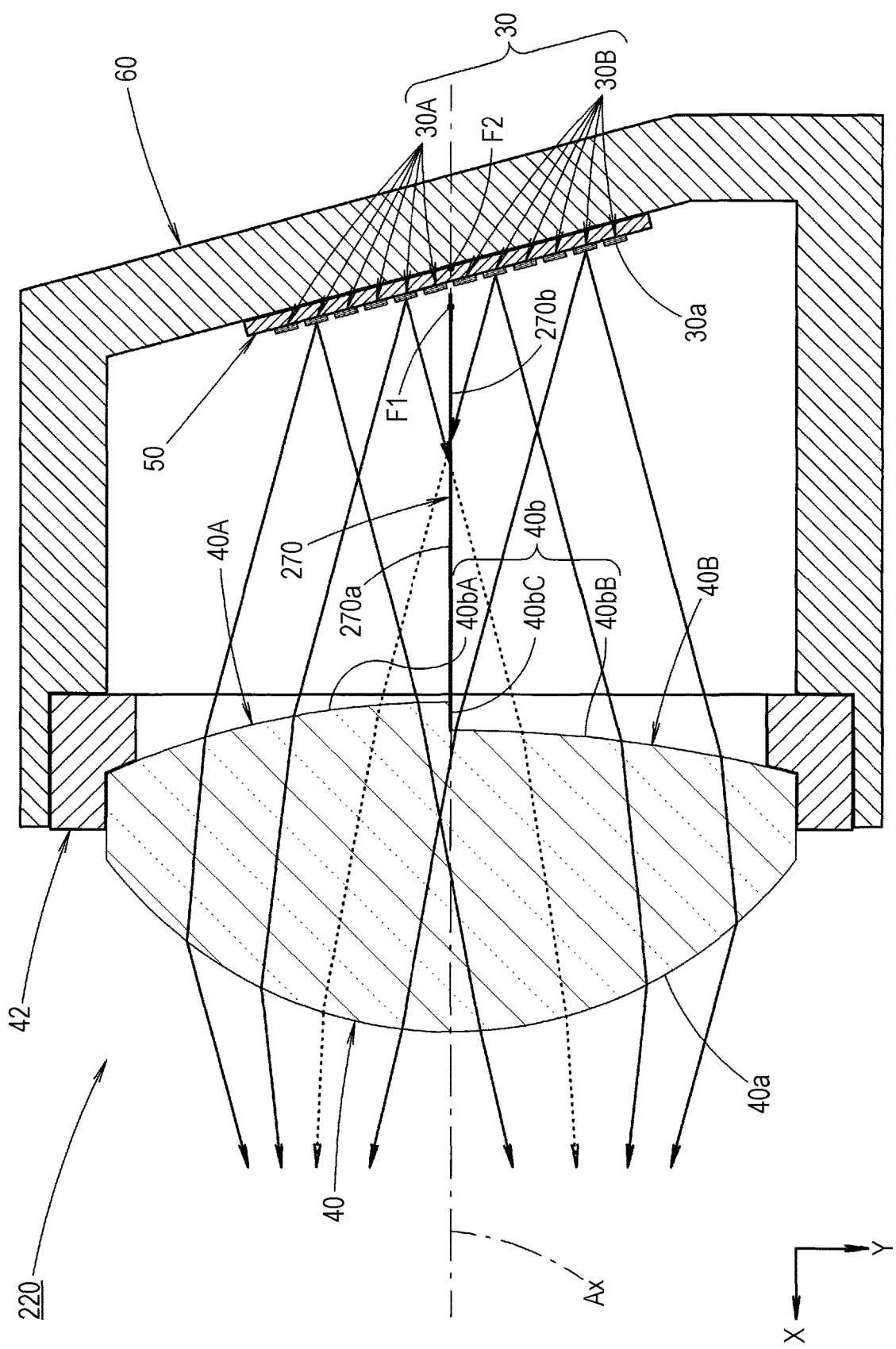
FIG. 9 is a view similar to FIG. 3, which shows a second modification of the embodiment.

FIG. 9 is a view similar to FIG. 3, which shows a lamp unit 220 of a vehicle lamp according to the present modification.

As shown in FIG. 9, a basic configuration of the lamp unit 220 is similar to that of the lamp unit 20 of the above-described embodiment, but the lamp unit 220 is different from the case of the above-described embodiment in that a light shielding plate 270 is additionally arranged.

The light shielding plate 270 has the same shape as that of the light shielding plate 170 of the first modification, but the right surface 270a and left surface 270b thereof are not subjected to the reflection surface treatment, and instead, is subjected to surface treatment (for example, black coating) for preventing light reflection.

In addition, in the present modification, on each of the six first light emitting elements 30A and the six second light emitting elements 30B, ON/OFF control is performed according to a subject vehicle traveling state by a not-shown electronic control unit. In this case, the subject vehicle traveling state can be grasped based on, for example, detection values of steering angle data, navigation data, front traveling path image data on a subject vehicle.

Figure 10:
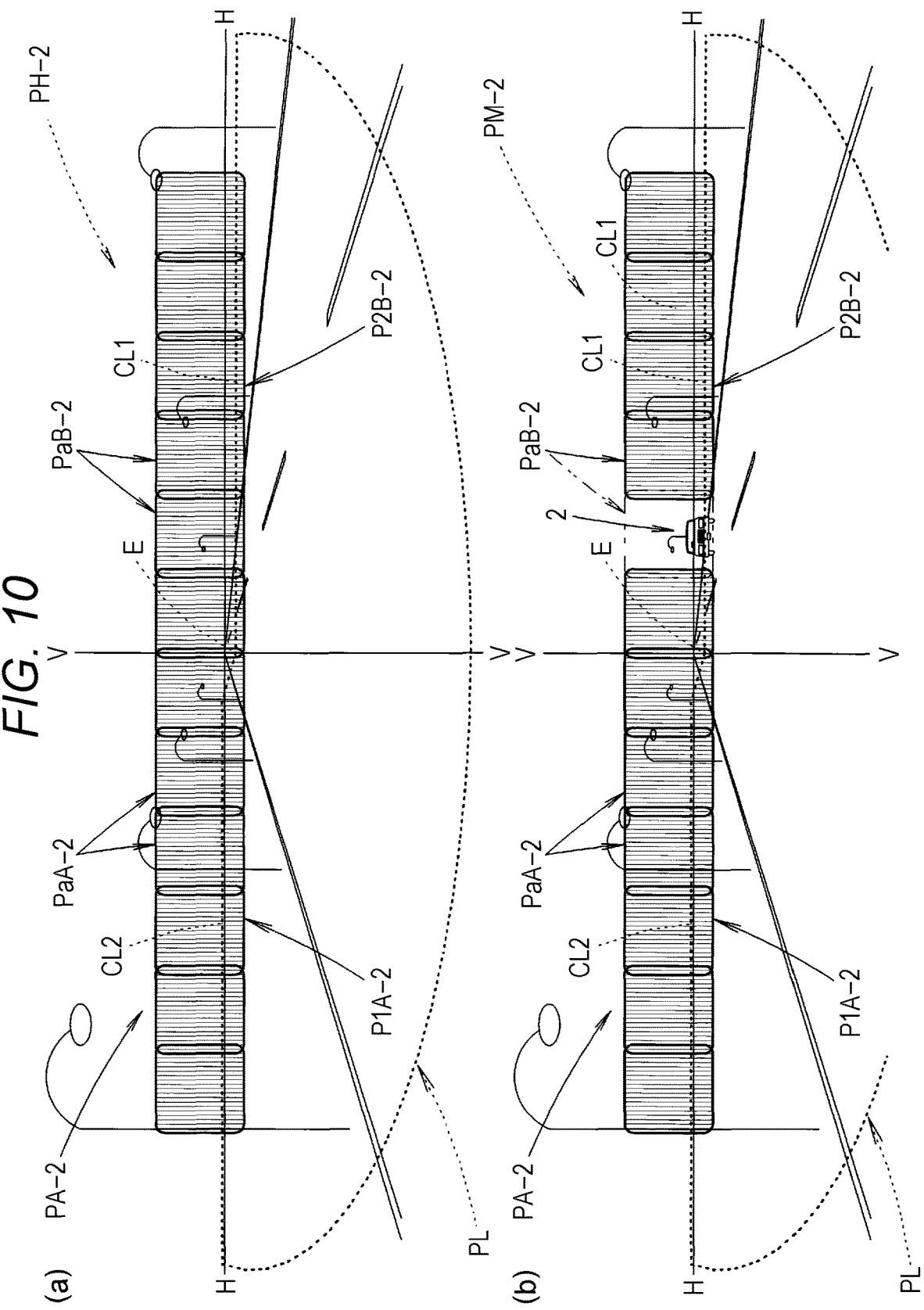
FIG. 10 is a view similar to FIG. 4, which shows the features of the second modification.

FIG. 10(a) is a transparent view showing an additional light distribution pattern PA-2 formed on the virtual vertical screen by light emitted from the lamp unit 220 to the lamp front.

As shown in FIG. 10(a), the additional light distribution pattern PA-2 is formed as a horizontally-long light distribution pattern elongated in the left-right direction on the H-H line as in the additional light distribution pattern PA of the above-described embodiment.

The additional light distribution pattern PA-2 overlaps, in a lower end region thereof, with a region of the low-beam light distribution pattern PL in the vicinity of the cutoff line, whereby a high-beam light distribution pattern PH-2 is formed as a light distribution pattern having no gap between the low-beam light distribution pattern PL and the additional light distribution pattern PA-2.

The additional light distribution pattern PA-2 is formed as a combined light distribution pattern of two light distribution patterns P1A-2, P2B-2.

The light distribution pattern P1A-2 is a light distribution pattern similar to the light distribution pattern P1A shown in FIG. 5(a1), and the light distribution pattern P2B-2 is a light distribution pattern similar to the light distribution pattern P2B shown in FIG. 5(a2).

FIG. 10(b) is a transparent view showing an intermediate light distribution pattern PM-2 in which part of the high-beam light distribution pattern PH-2 is missing.

FIG. 10(b) shows the intermediate light distribution pattern PM-2 in which a fifth small light distribution pattern PaB-2 from the right among 12 small light distribution patterns PaA-2, PaB-2 forming the additional light distribution pattern PA-2 is missing because the fifth second light emitting element 30B from the left has been turned off.

By forming such an intermediate light distribution pattern PM-2, the light emitted from the lamp unit 220 is prevented from hitting an oncoming vehicle 2, so that the traveling path in front can be irradiated as widely as possible within a range in which glare is not given to a driver of the oncoming vehicle 2.

As the position of the oncoming vehicle 2 changes, the shape of the intermediate light distribution pattern PM-2 can be changed by sequentially switching the first light emitting element 30A and/or the second light emitting element 30B to be turned off.

Note that the presence of the oncoming vehicle 2 is detected by, e.g., a not-shown in-vehicle camera. Even in a case where a preceding vehicle is present on the traveling path in front or a pedestrian is present on a road shoulder, the presence of the preceding vehicle or the pedestrian is detected and glare is avoided by missing some of the small light distribution patterns PaA-2, PaB-2.

Even in a case where the configuration of the present modification is employed, it is possible to obtain features and advantageous effects substantially similar to those in the case of the above-described embodiment.

In addition, in the present modification, by forming the intermediate light distribution pattern PM-2, the traveling path in front can be irradiated as widely as possible within the range in which glare is not given to, e.g., the driver of the oncoming vehicle 2.

Next, a third modification of the above-described embodiment will be described.

Figure 11:
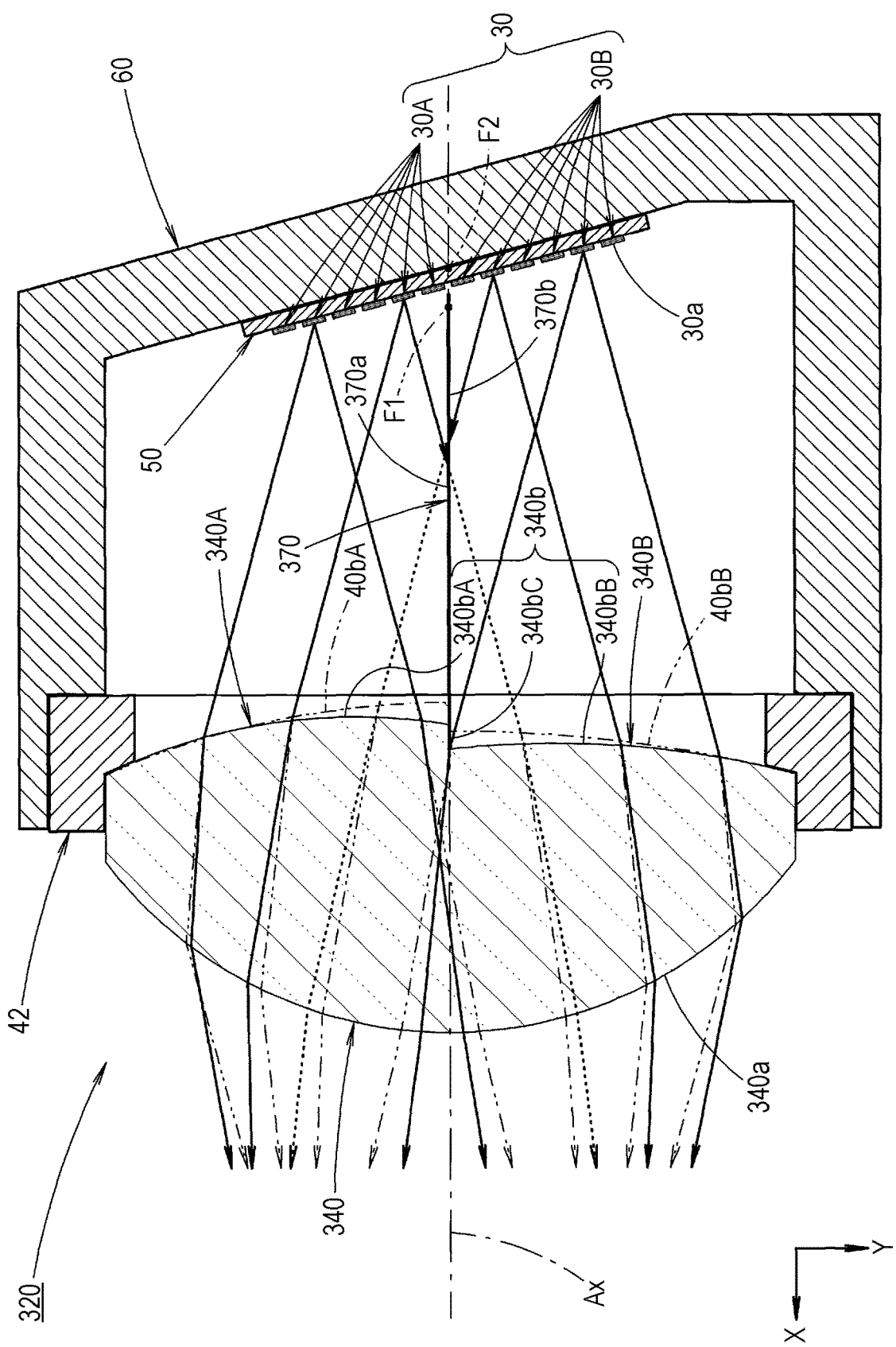

FIG. 11 is a view similar to FIG. 3, which shows a lamp unit 320 of a vehicle lamp according to the present modification.

As shown in FIG. 11, a basic configuration of the lamp unit 320 is similar to that of the lamp unit 20 of the above-described embodiment, but the lamp unit 320 is partially different from the case of the above-described embodiment in the configuration of a projection lens 340. Also in the present modification, a light shielding plate 370 similar to the light shielding plate 270 of the second modification is arranged.

That is, the projection lens 340 of the present modification is also configured such that a front surface 340a thereof has the same shape as that of the front surface 40a of the projection lens 40 of the above-described embodiment, and the back surface 340b thereof is configured such that a first back surface region 340bA located on the right side with respect to the optical axis Ax and a second back surface region 340bB located on the left side with respect to the optical axis Ax are connected to each other by a connection region 340bC extending along the vertical plane including the optical axis Ax. However, the surface shape of each of the first and second back surface regions 340bA, 340bB is different from that of the case of the above-described embodiment.

Specifically, the first back surface region 340bA has such a convex surface shape that the left region of a first back surface region 40bA (indicated by a two-dot chain line in FIG. 11) of the above-described embodiment is deformed to the lamp front side, and a second back surface region 340bB has such a convex surface shape that the right region of a second back surface region 40bB (indicated by a two-dot chain line in FIG. 11) of the above-described embodiment is deformed to the lamp front side.

Thus, the projection lens 340 emits, in a first lens region 340A located on the right side with respect to the optical axis Ax, the direct light from the six first light emitting elements 30A to the lamp front in a state of the light being displaced to the right side as compared to the case of the above-described embodiment, and in a second lens region 340B located on the left side with respect to the optical axis Ax, the projection lens 340 emits the direct light from the six second light emitting elements 30B to the lamp front in a state of the light being displaced to the left side as compared to the case of the above-described embodiment.

Note that an optical path indicated by a two-dot chain line in FIG. 11 is an optical path in a case where the first and second back surface regions 340bA. 340bB remain as the first and second back surface regions 40bA, 40bB of the above-described embodiment.

Similarly to the light shielding plate 270 of the second modification, the light shielding plate 370 has a right surface 370a and a left surface 370b that have been subjected to surface treatment for preventing light reflection.

FIG. 12(a) is a transparent view showing an additional light distribution pattern PA-3 formed on the virtual vertical screen by light emitted from the lamp unit 320 to the lamp front.

As shown in FIG. 12(a), the additional light distribution pattern PA-3 is formed as a horizontally-long light distribution pattern elongated in the left-right direction on the H-H line as in the additional light distribution pattern PA of the above-described embodiment.

The additional light distribution pattern PA-3 overlaps, in a lower end region thereof, with a region of the low-beam light distribution pattern PL in the vicinity of the cutoff line, whereby a high-beam light distribution pattern PH-3 is formed as a light distribution pattern having no gap between the low-beam light distribution pattern PL and the additional light distribution pattern PA-3.

Figure 12:
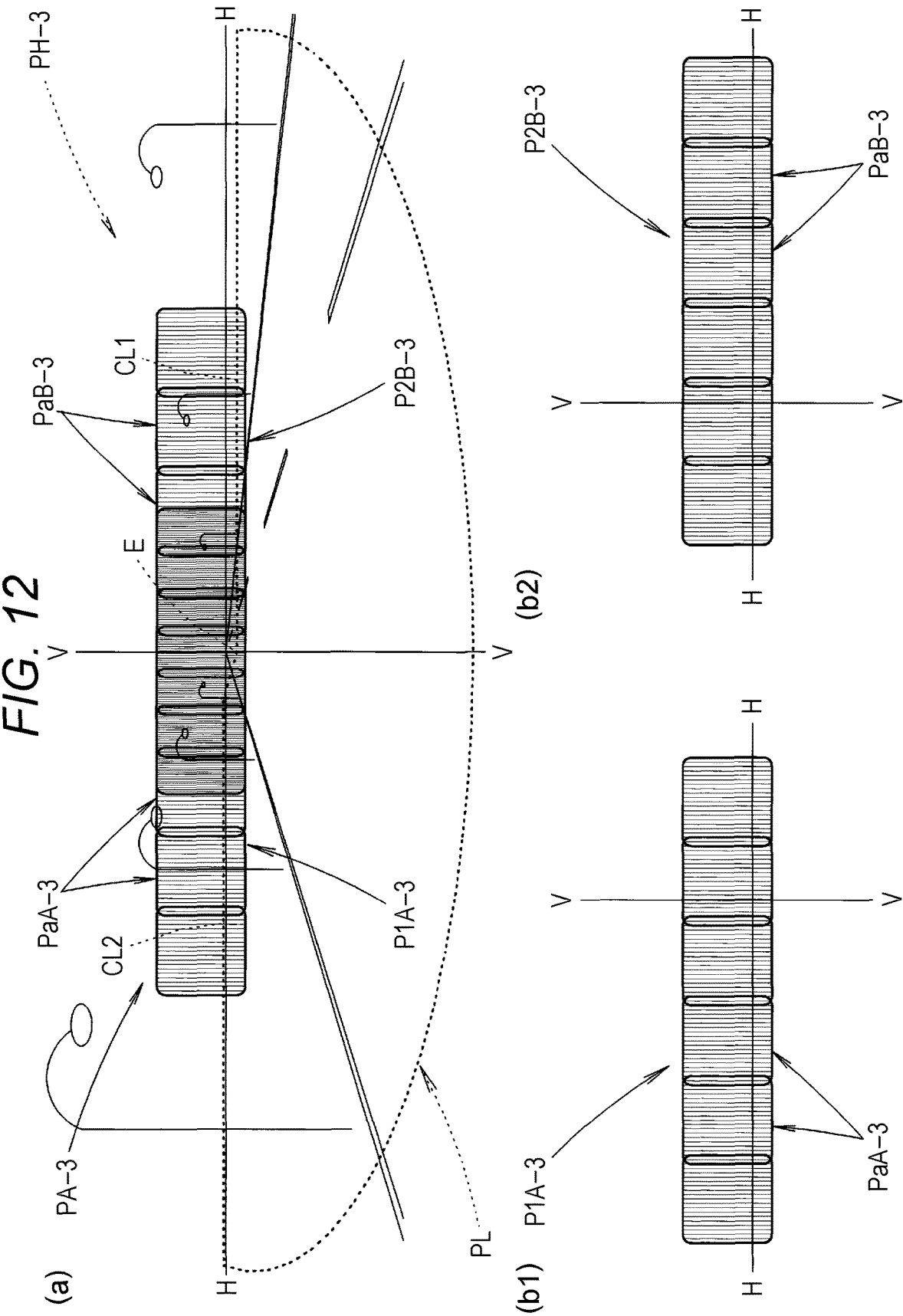
FIG. 12 is a view similar to FIGS. 4 and 5, which shows the features of the third modification.

The additional light distribution pattern PA-3 is formed as a combined light distribution pattern of a light distribution pattern P1A-3 shown in FIG. 12(b1) and a light distribution pattern P2B-3 shown in FIG. 12(b2).

As shown in FIG. 12(b1), the light distribution pattern P1A-3 is a light distribution pattern formed by the direct light emitted from the six first light emitting elements 30A and penetrated the first lens region 340A of the projection lens 340.

Similarly to the light distribution pattern P1A shown in FIG. 5(a1), the light distribution pattern P1A-3 is formed as a horizontally-long bright light distribution pattern as a combined light distribution pattern of six small light distribution patterns PaA-3, but is formed in a state of being displaced to the right side as compared to the light distribution pattern P1A shown in FIG. 5(a1). This is because the first lens region 340A is configured such that the direct light from the six first light emitting elements 30A is emitted to the lamp front in a state of being displaced to the right side as compared to the case of the above-described embodiment.

As shown in FIG. 12(b2), the light distribution pattern P2B-3 is a light distribution pattern formed by the direct light emitted from the six second light emitting elements 30B and penetrated the second lens region 340B of the projection lens 340.

Similarly to the light distribution pattern P2B shown in FIG. 5(a2), the light distribution pattern P2B-3 is formed as a horizontally-long bright light distribution pattern as a combined light distribution pattern of six small light distribution patterns PaB-3, but is formed in a state of being displaced to the left side as compared to the light distribution pattern P2B shown in FIG. 5(a2). This is because the second lens region 340B is configured such that the direct light from the six second light emitting elements 30B is emitted to the lamp front in a state of being displaced to the left side as compared to the case of the above-described embodiment.

As shown in FIG. 12(a), the additional light distribution pattern PA-3 is formed as a horizontally-long, bright, and clear light distribution pattern by the pair of left and right light distribution patterns P1A-3, P2B-3, and in a center region thereof, the pair of left and right light distribution patterns P1A-3, P2B-3 overlap with each other. Thus, the brightness of the center region is enhanced. As a result, the high-beam light distribution pattern PH-3 provides excellent visibility of the traveling path in the vehicle front.

In this case, in the center region of the additional light distribution pattern PA-3, the six small light distribution patterns PaA-3 forming the light distribution pattern P1A-3 and the six small light distribution patterns PaB-3 forming the light distribution pattern P2B-3 are alternately formed in a state of being shifted by a half pitch, and therefore, the central region of the additional light distribution pattern PA-3 is formed with substantially uniform brightness.

Even in a case where the configuration of the present modification is employed, it is possible to obtain features and advantageous effects substantially similar to those in the case of the above-described embodiment.

In particular, in the present modification, since the center region of the additional light distribution pattern PA-3 can be formed as a substantially-uniform sufficiently-bright light distribution pattern, the high-beam light distribution pattern PH-3 can be a light distribution pattern excellent in distance visibility.

In addition, even in a case where the configuration of the present modification is employed, it is possible to form an intermediate light distribution pattern substantially similar to that of the case of the second modification by appropriately missing some of the 12 small light distribution patterns PaA-3, PaB-3 forming the additional light distribution pattern PA-3.

Next, a fourth modification of the above-described embodiment will be described.

Figure 13:
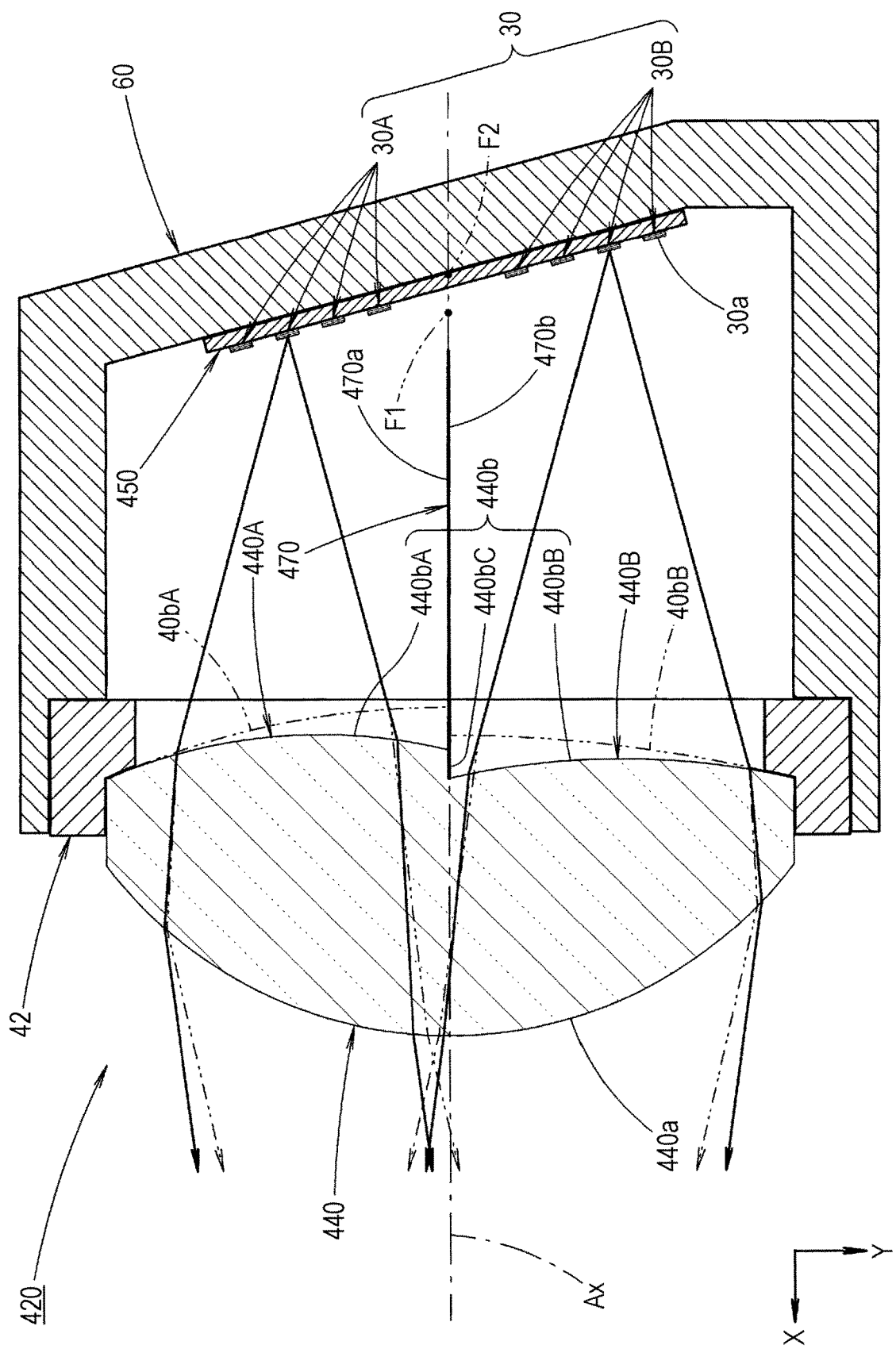
FIG. 13 is a view similar to FIG. 3, which shows a fourth modification of the embodiment.

FIG. 13 is a view similar to FIG. 3, which shows a lamp unit 420 of a vehicle lamp according to the present modification.

As shown in FIG. 13, a basic configuration of the lamp unit 420 is similar to that of the lamp unit 20 of the above-described embodiment, but the lamp unit 420 is different from the case of the above-described embodiment in the number and arrangement of light emitting elements 30 and is partially different from the case of the above-described embodiment in the configuration of a projection lens 440. Further, also in the present modification, a light shielding plate 470 similar to the light shielding plate 270 of the second modification is arranged.

In the present modification, as the plurality of light emitting elements 30, four first light emitting elements 30A are arranged on the right side with respect to the optical axis Ax, and four second light emitting elements 30B are arranged on the left side with respect to the optical axis Ax. In this state, the four first light emitting elements 30A are arranged at positions away from the optical axis Ax toward a front end portion of a substrate 450 at intervals wider than those in the case of the above-described embodiment, and the four second light emitting elements 30B are arranged at positions away from the optical axis Ax toward a back end portion of the substrate 450 at intervals wider than those in the case of the above-described embodiment.

Accordingly, the substrate 450 of the present modification is formed with a greater vertical width than that of the substrate 50 of the above-described embodiment.

The projection lens 440 of the present modification is also configured such that the front surface 440a thereof has the same shape as that of the front surface 40a of the projection lens 40 of the above-described embodiment, and the back surface 440b thereof is configured such that a first back surface region 440bA located on the right side with respect to the optical axis Ax and a second back surface region 440bB located on the left side with respect to the optical axis Ax are connected to each other by a connection region 440bC extending along the vertical plane including the optical axis Ax. However, the surface shape of each of the first and second back surface regions 440bA, 440bB is different from that of the case of the above-described embodiment.

Specifically, the first back surface region 440bA has such a convex surface shape that the left region of the first back surface region 40bA (indicated by a two-dot chain line in FIG. 13) of the above-described embodiment is more deformed to the lamp front side as compared to the case of the third modification, and the second back surface region 440bB has such a convex surface shape that the right region of the second back surface region 40bB (indicated by a two-dot chain line in FIG. 13) of the above-described embodiment is more deformed to the lamp front side as compared to the case of the third modification.

Thus, the projection lens 440 emits, in a first lens region 440A located on the right side with respect to the optical axis Ax, the direct light from the four first light emitting elements 30A to the lamp front in a state of the light being more displaced to the right side as compared to the case of the third modification, and in a second lens region 440B located on the left side with respect to the optical axis Ax, the projection lens 440 emits the direct light from the four second light emitting elements 30B to the lamp front in a state of the light being more displaced to the left side as compared to the case of the third modification.

Note that an optical path indicated by a two-dot chain line in FIG. 13 is an optical path in a case where the first and second back surface regions 440bA, 440bB remain as the first and second back surface regions 40bA, 40bB of the above-described embodiment.

Similarly to the light shielding plate 270 of the second modification, the light shielding plate 470 has a right surface 470a and a left surface 470b that have been subjected to surface treatment for preventing light reflection. Note that the position of the back edge of the light shielding plate 470 is located closer to the lamp front side as compared to the light shielding plate 270 of the second modification. Even when such a configuration is employed, the four first light emitting elements 30A and the four second light emitting elements 30B are away from the optical axis Ax by a certain distance, and therefore, there is no possibility that the light enters the second lens region 440B and the first lens region 440A on the opposite sides in the left-right direction.

FIG. 14(a) is a transparent view showing an additional light distribution pattern PA-4 formed on the virtual vertical screen by light emitted from the lamp unit 420 to the lamp front.

As shown in FIG. 14(a), the additional light distribution pattern PA-4 is formed as a horizontally-long light distribution pattern elongated in the left-right direction on the H-H line as in the additional light distribution pattern PA of the above-described embodiment. Note that FIG. 14(a) shows an intermediate light distribution pattern PM-4 in which part of a high-beam light distribution pattern is missing.

Figure 14:
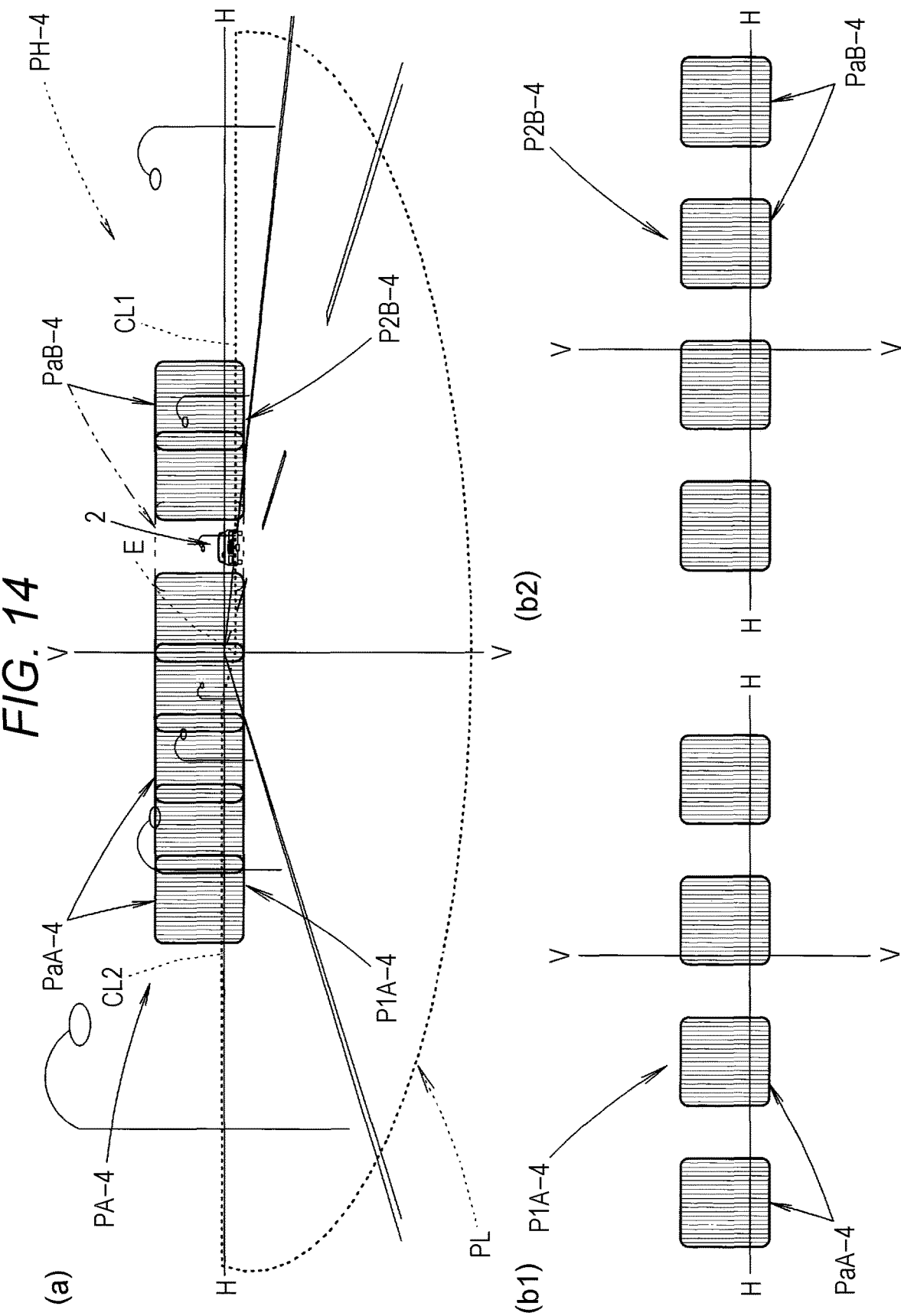
FIG. 14 is a view similar to FIGS. 4 and 5, which shows the features of the fourth modification.

The additional light distribution pattern PA-4 is formed as a combined light distribution pattern of a light distribution pattern P1A-4 shown in FIG. 14(b1) and a light distribution pattern P2B-4 shown in FIG. 14(b2).

As shown in FIG. 14(b1), the light distribution pattern P1A-4 is formed as a discrete light distribution pattern in which four small light distribution patterns PaA-4 are arranged at intervals in the left-right direction. In this case, arrangement of the four first light emitting elements 30A is set such that a gap between the small light distribution patterns PaA-4 is about ¼ to ¾ of the horizontal width of the small light distribution pattern PaA-4.

As shown in FIG. 14(b2), the light distribution pattern P2B-4 is formed as a discrete light distribution pattern in which four small light distribution patterns PaB-4 are arranged at intervals in the left-right direction. In this case, arrangement of the four second light emitting elements 30B is set such that a gap between the small light distribution patterns PaB-4 is about ¼ to ¾ of the horizontal width of the small light distribution pattern PaB-4.

As shown in FIG. 14(a), the additional light distribution pattern PA-4 is formed in a state in which the four small light distribution patterns PaA-4 forming the light distribution pattern P1A-4 and the four small light distribution patterns PaB-4 forming the light distribution pattern P2B-4 alternately and partially overlap with each other. Such an additional light distribution pattern PA-4 is formed by appropriately adjusting the surface shapes of the first back surface region 440bA and second back surface region 440bB of the projection lens 440.

FIG. 14(a) shows the intermediate light distribution pattern PM-4 in which the third small light distribution pattern PaB-4 from the right among the eight small light distribution patterns PaA-4, PaB-4 forming the additional light distribution pattern PA-4 is missing because the second light emitting element 30B from the left has been turned off.

By forming such an intermediate light distribution pattern PM-4, the light emitted from the lamp unit 420 is prevented from hitting the oncoming vehicle 2, so that the traveling path in front can be irradiated as widely as possible within the range in which glare is not given to the driver of the oncoming vehicle 2.

Even in a case where the configuration of the present modification is employed, it is possible to obtain features and advantageous effects substantially similar to those in the case of the above-described embodiment.

In addition, in the present modification, by forming the intermediate light distribution pattern PM-4, the traveling path in front can be irradiated as widely as possible within the range in which glare is not given to, e.g., the driver of the oncoming vehicle 2.

In this case, since the additional light distribution pattern PA-4 is formed in a state in which the four small light distribution patterns PaA-4 (that is, first projection images formed by the direct light from the first light emitting elements 30A) and the four small light distribution patterns PaB-4 (that is, second projection images formed by the direct light from the second light emitting elements 30B) alternately and partially overlap with each other, it is possible to narrow the minimum horizontal width of a gap (dark portion) when some of the eight small light distribution patterns PaA-4, PaB-4 are missing. Thus, the traveling path in front can be irradiated more widely.

Note that the numerical values indicated as the specifications in the above embodiment and the modifications thereof are merely examples, and naturally the numerical values may be set at different values as appropriate.

Moreover, the invention of the present application is not limited to the configurations described in the above embodiment and the modifications thereof, and it is possible to adopt a configuration to which various modifications other than the configurations described above are added.

The present international application claims priority based on Japanese Patent Application No. 2021-176480 filed on Oct. 28, 2021, and the entire contents of Japanese Patent Application No. 2021-176480, which is the Japanese patent application of the present international application, are incorporated herein by reference.

The above description of the specific embodiments of the present invention has been presented for the purpose of illustration. The embodiments are not intended to be exhaustive or to limit the invention as it is in the form described. It is obvious to those skilled in the art that many modifications and alterations are possible in light of the contents of the description above.

LIST OF REFERENCE SIGNS

2 Oncoming Vehicle
10 Vehicle Lamp
12 Lamp Body
14 Translucent Cover
20, 120, 220, 320, 420 Lamp Unit
30 Light Emitting Element
30a Light Emitting Surface
30A First Light Emitting Element
30B Second Light Emitting Element
40, 340, 440 Projection Lens
40a, 340a, 440a Front Surface
40A, 340A, 440A First Lens Region
40b, 340b, 440b Back Surface
40bA, 340bA, 440bA First Back Surface Region
40bB, 340bB, 440bB Second Back Surface Region
40bC, 340bC, 440bC Connection Region
40B, 340B, 440B Second Lens Region
42 Lens Holder
50, 450 Substrate
60 Heat Sink
170, 270, 370, 470 Light Shielding Plate (Light Shielding Member)
170a, 270a, 370a, 470a Right Surface
170b, 270b, 370b, 470a Left Surface
Ax Optical Axis
CL1 Lower Cut-Off Line
CL2 Upper Cut-Off Line
E Elbow Point
F1, F2 Back Focal Point
P1A, P1A-1, P1A-2, P1A-3, P1A-4, P1B, P1R-1, P2A, P2B, P2B-1, P2B-2, P2B-3, P2B-4, P2R-1 Light Distribution Pattern
PaA, PaA-1, PaA-2, PaA-3, PaA-4 Small Light Distribution Pattern (First Projection Image)
PaB, PaB-1, PaB-2, PaB-3, PaB-4 Small Light Distribution Pattern (Second Projection Image)
PA, PA-1, PA-2, PA-3, PA-4 Additional Light Distribution Pattern
PH, PH-1, PH-2, PH-3 High-Beam Light Distribution Pattern
PL Low-Beam Light Distribution Pattern
PM-2, PM-4 Intermediate Light Distribution Pattern

The invention claimed is:

1. A vehicle lamp comprising: a plurality of light emitting elements and a projection lens, the vehicle lamp being configured to form a horizontally-long light distribution pattern by emitting light from the plurality of light emitting elements to a lamp front via the projection lens, wherein
the plurality of light emitting elements is mounted on a common substrate in a state in which the light emitting elements are arranged in a left-right direction and light emitting surfaces thereof face the projection lens,
the substrate is arranged in a state of being inclined in the left-right direction with respect to a vertical plane perpendicular to a lamp front-back direction,
the plurality of light emitting elements includes a plurality of first light emitting elements located closer to a front end portion of the substrate and a plurality of second light emitting elements located closer to a back end portion of the substrate,
the projection lens is divided into a first lens region for controlling direct light from the plurality of first light emitting elements and a second lens region for controlling direct light from the plurality of second light emitting elements, and
the projection lens is configured such that a focal length of the second lens region is set to a value greater than a focal length of the first lens region.

2. The vehicle lamp according to claim 1, wherein
a front surface of the projection lens is a single convex surface, and
a back surface of the projection lens is a curved surface in which the first lens region and the second lens region have curvatures different from each other or a flat surface.

3. The vehicle lamp according to claim 2, wherein in the back surface of the projection lens, a surface shape of each of the first and second lens regions is set such that a first projection image formed by the direct light from each of the plurality of first light emitting elements and a second projection image formed by the direct light from each of the plurality of second light emitting elements alternately and partially overlap with each other in the horizontally-long light distribution pattern.

4. The vehicle lamp according to claim 1, wherein the plurality of light emitting elements is configured to be individually turned on.

5. The vehicle lamp according to claim 1, further comprising: a light shielding member that prevents incidence of the direct light from the plurality of first light emitting elements on the second lens region and incidence of the direct light from the plurality of second light emitting elements on the first lens region.

6. The vehicle lamp according to claim 5, wherein the light shielding member includes a light shielding plate arranged between the substrate and the projection lens along a vertical plane extending in the lamp front-back direction, and
both left and right surfaces of the light shielding plate are formed as reflection surfaces.

* * * * *